Oct. 15, 1957    J. F. MIDDLETON    2,809,924
APPARATUS FOR FRACTIONALLY DISTILLING COMPOSITE LIQUIDS
Filed Nov. 6, 1953    2 Sheets-Sheet 1

Inventor
JOHN F. MIDDLETON

By

C. R. Miranda
Attorney

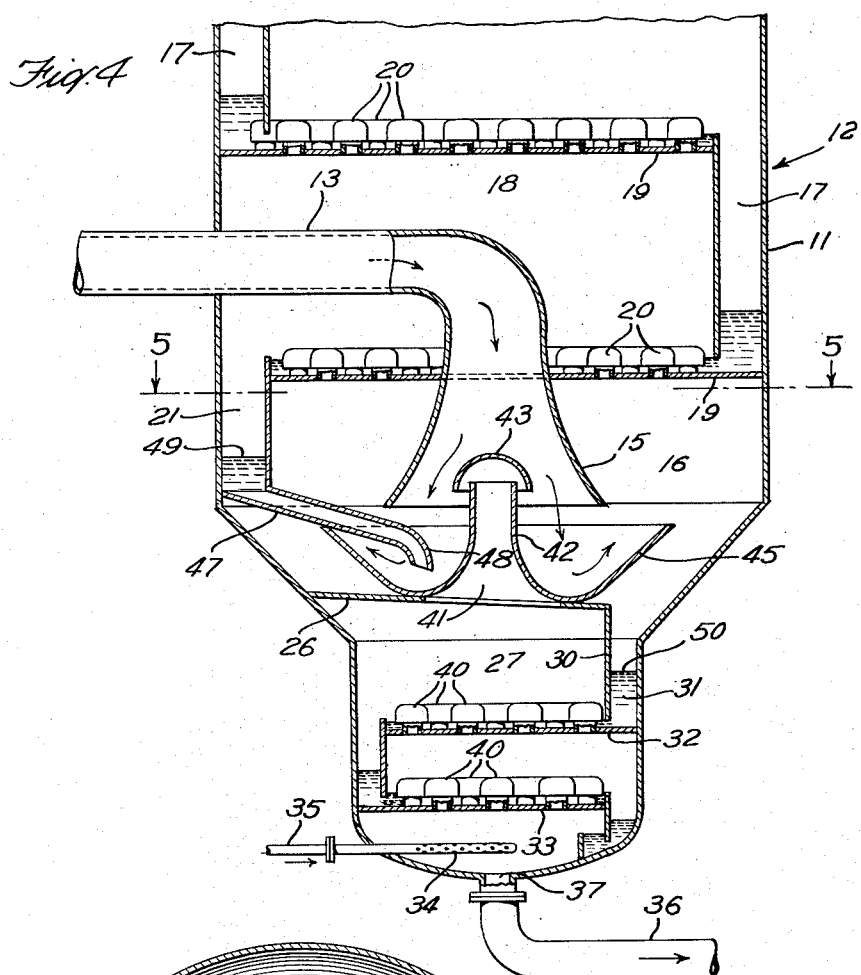

United States Patent Office 2,809,924
Patented Oct. 15, 1957

2,809,924

APPARATUS FOR FRACTIONALLY DISTILLING COMPOSITE LIQUIDS

John F. Middleton, Bronx, N. Y., assignor to Foster Wheeler Corporation, New York, N. Y., a corporation of New York Application November 6, 1953, Serial No. 390,443

6 Claims. (Cl. 196—139)

This invention relates to distillation apparatus and more particularly to apparatus and method for fractionally distilling composite liquids, such as hydrocarbon oils, and the like. Specifically, the present invention is directed to the flash zones of distillation towers.

In the fractional distillation of hydrocarbon oils, especially crude petroleum and petroleum residues, the oil which has been previously heated to a high temperature is generally introduced into the tower, at a temperature sufficiently high to flash a portion of the oil into vapor, and into a zone located between the rectifying and stripping sections of the tower. The vapor flashed off is customarily passed to the rectifying or enriching section of the tower generally comprising a series of bubble trays, where the vapor is passed countercurrent to reflux liquid with a consequent condensation of the condensable constituents of the vapor and simultaneous vaporization of the volatile constituents of the reflux liquid at each stage of contact. The vapor not condensed in its passage through the bubble trays, ordinarily passes out of the top of the tower through suitable heat exchange equipment in which all the condensable vapors are condensed. Part of the condensed vapor is usually returned to the top tray of the tower to provide the stream of reflux required to effect the fractionation. The remainder of the condensate and the non-condensable gases are removed from the system as products. Other products may be withdrawn as side-streams by withdrawing liquid from selected trays in the rectifying section.

At present, flash zones in fractionating towers used in the distillation of crude petroleum and petroleum residues are arranged so that preheated feed stock or charge is introduced into the tower in a way to cause rapid separation of liquid and vapor phases. The separated liquid runs down to a stripping section generally comprising a series of bubble trays, where it is joined by reflux condensed in the lowermost tray of the rectifying section. The combined liquid is stripped of volatile constituents in the stripping section by means of superheated steam introduced below the bottom tray in the stripping section and flows through the bubble trays of the stripping section countercurrent to the liquid stream. The stripped liquid flowing from the bottom tray of the stripping section is removed from the fractionating tower and cooled as the residual product of the distillation. Oftentimes, steam is also introduced into the tubes of the heater, wherein the charge is preheated, to provide greater vaporization of the feed when the latter discharges into the flash zone without increasing the maximum allowable temperature of the oil in the heater. In such instances, either a greater pressure drop is required to force the charge through the heater or it is necessary to install larger tubes between the point of introducing the steam and the tower.

The present invention contemplates distillation apparatus wherein a novel flash zone arrangement is provided to effect a greater amount of vaporization per unit charge than that obtained with present day flash zone arrangements when the steam consumption and the maximum temperature of the feed in the heater are the same in both instances. In accordance with the present invention, the flash zone provides for the vaporization of the feed stock not only in the presence of the volatile portion of the feed and whatever steam that has been introduced into the heater, but also in the presence of the steam from the stripping section. Furthermore, the liquid reflux from the rectifying section is mixed with the vaporizing feed to cause most of that liquid to vaporize without the latter entering the stripping section.

The invention will be understood from the following description when considered with the accompanying drawings in which:

Fig. 4 is an elevational view, in section, of a second embodiment of the present invention; and Fig. 5 is a section taken along line 5—5 of Fig. 4.

Like reference characters refer to the like parts throughout the several views.

Figure 1:
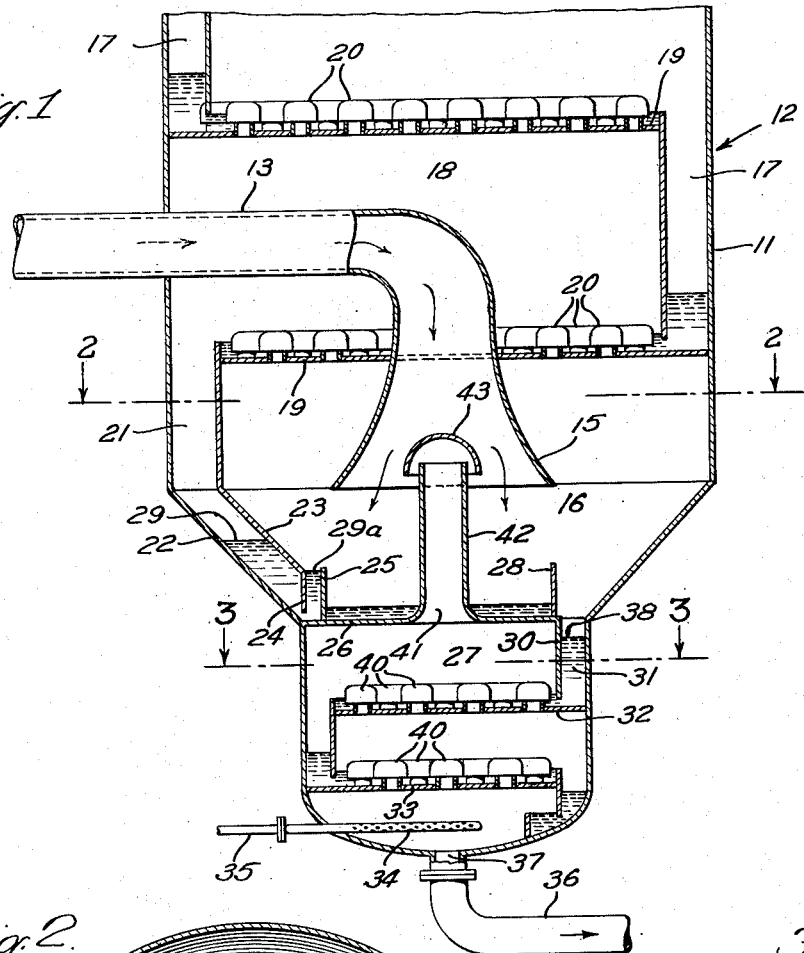
Fig. 1 is an elevational view, in section, of a portion of a fractionating tower disclosing one embodiment of the present invention.
Figure 2:
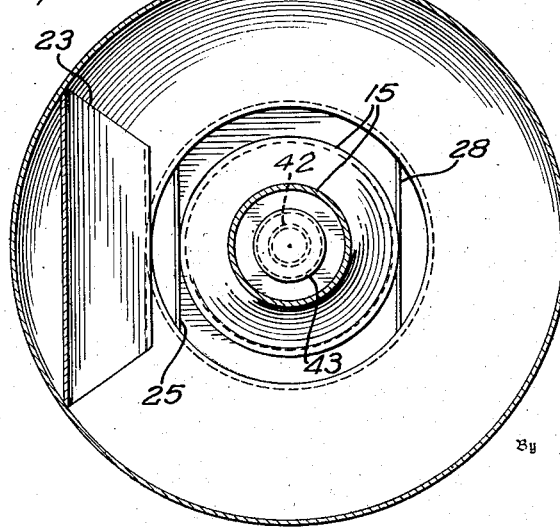
Fig. 2 is a section taken along line 2—2 of Fig. 1.
Figure 3:
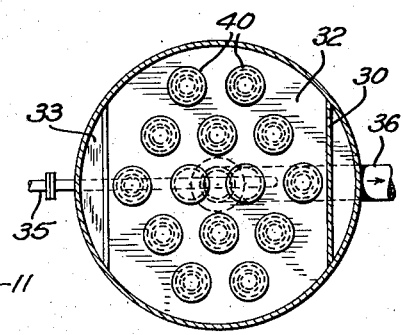
Fig. 3 is a section taken along line 3—3 of Fig. 1.

Referring now to the drawings for a more detailed description of the present invention and more particularly to Fig. 1, wherein one embodiment thereof is illustrated, the reference numeral 11 designates the lower portion of a fractionating tower 12. A feed conduit 13 is connected at one end to a heater (not shown) which provides the conduit with a mixture of vapor and liquid, as for example hydrocarbon oils, heated to a high temperature. The conduit 13 projects through the peripheral wall of lower portion 11 and has a flared, or bell-shaped, end 15 disposed concentrically with the shell and in a flash zone 16 or separation section of tower 12. The mixture emerges from flared end 15 at a temperature sufficiently high to flash a substantial part of the oil into vapor thereby causing a stream of vapor carrying entrained liquid drops to flow downwardly from the flared end 15 at high velocity and in a high state of turbulence. Arranged above flash zone 16 is a rectifying section 18 which comprises a plurality of bubble trays 19 (only two shown in Fig. 1) having bubble caps 20. Trays 19 extend vertically and adjacent to the top of tower 12 (not shown) where reflux liquid is introduced to flow downwardly over each tray 19. Flashed vapor, after separating from the entrained liquid in the flash zone 16, passes through openings in the trays, and from caps 20, countercurrent to the reflux liquid, whereby rectification of the vapor is effected in a manner well known in the art. The vapor not condensed in its passage through bubble trays passes out of the tower through suitable heat exchanger equipment where it is condensed and part of it is returned to the top tray 19 as reflux.

Reflux liquid flows across the top tray (not shown) of the rectifying section 18, through a downcomer 17 to the next tray below, thereafter flowing alternately across a tray 19 and down through a downcomer 17. Finally the reflux liquid flows off of the lowermost tray 19 of the rectifying section 18 and thence through a downcomer 21 into an inclined passageway 22 defined by a portion of the tower wall and an inclined plate 23. Plate 23 has a depending portion or baffle 24 which is disposed parallel to a second baffle 25 carried by a circular tray or plate 26. A segment of tray 26 is cutout to communicate flash zone 16 with a stripping section 27 and, arranged at the cutout is a baffle 28 parallel to baffles 24 and 25. Opposite and vertically extending edges of the baffles 24 and 25 and 28 meet the wall of tower 12 and thereby prevent passage of liquid between the baffle edges and the tower wall.

The baffles 25 and 28 are secured to plate 26 along the entire lengths of their bottom edges. The bottom edge of baffle 24 is spaced from plate 26 a sufficient distance to permit the reflux liquid from the rectifying section to pass underneath it, but not more than is necessary to maintain a head of liquid at 29 within the passageway 22 at all times during operation. By these means, a liquid seal is maintained at 29 in the passageway 22 and at 29a between baffles 24 and 25 which prevents the flow of feed vapor through passageway 22 and downcomer 21 and the consequent bypassing of the lowermost tray 19 of rectifying section 18 by the vapor stream leaving flash zone 16. Plate 26 is arranged immediately below flared end 15 of conduit 13 and spaced from it by such a distance as will permit impact of the entering feed stream at high velocity against the liquid resident on plate 26 between baffles 25 and 28. The distance between the edge of the flared end 15 of feed pipe 13 and the upper edges of baffles 25 and 28 and between the flared end 15 and the tray 26 is such that the vapors moving radially beneath the edge of the flared end 15 travel at a velocity substantially greater than that prevailing in the vapor stream flowing vertically through the free cross-section of the tower in the upper region of flash zone 16, immediately below the lowermost tray 19 of the rectifying section. By reason of the foregoing construction, the reflux liquid entering flash zone 16 between baffles 24 and 25 initially will be entrained as droplets in the high velocity, turbulent vapor stream as it flows outwardly and upwardly from the flared end 15 towards the rectifying section. Because of the finely subdivided form of the liquid thus achieved, the relatively volatile characteristic of the reflux liquid, and the large amount of high temperature heat available in the feed at the point of contact, rapid vaporization of the reflux liquid ensues. The edge of flared end 15 of feed pipe 13 is located at a sufficient distance below the lowermost tray 19 of the rectifying section, and the free horizontal cross-section of the uppermost part of the flash zone 16 is large enough that velocity of the vapor approaching lowermost tray 19 is less than that required to maintain liquid entrainment over the intervening distance. The vapor stream, therefore, enters the bubble caps 20 of lowermost tray 19 substantially free of entrained liquid.

Circular tray 26 has a depending portion or baffle 30 extending into stripping section 27 to form a downcomer 31 and the baffle is spaced from an upper bubble tray 32. A lower bubble tray 33 is arranged in stripping section 27 above a perforated member 34 which is connected to a conduit 35 carrying superheated steam. It will be understood that two trays are chosen for the purpose of illustration only and in operation, whatever number of bubble trays that may be required in the stripping section can be installed. A conduit 36 communicates with an opening 37 formed in the bottom of tower 12 for withdrawing liquid from stripping section 27. A second liquid seal is provided at 38 and liquid from tray 26 and from the feed stream flows through downcomer 31 over the bubble trays 32 and 33 countercurrent to the upwardly flowing superheated steam which passes through openings in the trays and from bubble caps 40, carried by the trays. The liquid in stripping section 27 mixes with the steam thereby heating the steam to a temperature approaching that of the feed and causing a final separation of the residual volatile components of the liquid which thereafter flow upwardly in admixture with the steam. Circular tray 26 has a centrally disposed opening 41 and a vertical tubular element 42 which has its upper end extending into the center of flared end 15 of feed conduit 13. A cap 43 is mounted on the upper end of element 42 and the inner periphery of the cap is spaced from the tubular element to provide for escape and deflection of vapors from the latter. The steam and stripped vapors from stripping section 27 pass through opening 41 and tubular elements 42 and upon discharge from cap 43 are intimately mixed with the incoming feed at substantially the temperature of the latter. It will be understood that maximum vaporization of the feed in the flash zone is effected by causing the steam and hydrocarbon vapors from the stripping section to come into contact with the feed during the first moments of its expansion at the outlet of the feed pipe 13 and while the liquid and vapor portions of the feed are still in intimate contact with each other. The substantially complete vaporization of the reflux liquid is similarly effected by causing it to come into contact with the feed, combined with the steam and vapors from the stripping section, before the expansion of the feed vapor is complete and while liquid and vapor phases are still in intimate contact with each other. In this manner, not only is the liquid portion of the feed exposed to the lowest possible partial pressure condition, but also the entire enthalpy of the feed is available at the highest possible temperature to supply the heat required for the vaporization. In contrast with the above, the conventionally used flash zone causes rapid separation of liquid and vapor portions of the feed upon entry to the tower, so that the liquid portion mixes with reflux from the rectifying section on the top tray of the stripping section. The stripping of the volatile constituents of the liquid part of the feed and vaporization of the reflux depend entirely on the stripping steam, and only the enthalpy of the liquid portion of the feed is available to supply the heat of vaporization in the conventional flash zone arrangement. Thus the conditions achieved by the present invention are considerably more favorable for the vaporization of the liquid portion of the feed and the reflux liquid from the rectifying section than is possible by use of the conventional flash zone arrangement.

In operation, the feed or mixture of vapor and liquid from the heater (not shown) is delivered to flash zone 16 of tower 12 by way of flared end 15 of conduit 13. The steam from stripping section 27 mixes with the incoming feed at the point of entrance of the latter into flash zone 16 to reduce the partial pressure of the liquid portion of the feed in the ambient atmosphere, and so promotes increased vaporization of the liquid. The steam and resulting vapor thereafter pass upwardly in the tower through the bubble trays 19 countercurrent to the downwardly flowing reflux liquid, and products are withdrawn from the top of the tower and side streams as required. The reflux liquid from rectifying section 18 is conducted from lowermost tray 19 to the flash zone 16 where substantially all of this liquid is vaporized by the incoming feed. The unvaporized part of the feed and any remaining liquid reflux is then passed through the stripping section by way of downcomer 31. There, the volatile constituents are removed by the stripping steam and the bottoms are discharged from the tower through conduit 36. Simultaneously the steam rising through the stripping section is heated by the countercurrent flowing liquid so that the temperature of the steam upon issuing from below cap 43 approaches that of the incoming feed with which it intermixes at the outlet of the flared end 15. By vaporizing almost all of the reflux liquid from the rectifying section at the flash zone with incoming vaporizing feed, it will be seen that the steam requirement for the stripping section is materially reduced because the largest fraction of the stripping load is removed from the stripping section to the flash zone and the liquid to be stripped also enters the stripping section at a higher temperature than is possible in the conventional flash zone arrangement. Also, because the stripping steam is utilized to aid the vaporization of the liquid portion of the feed as it enters the tower 12 through flared end 15 of conduit 13, the amount of steam that would be introduced into the feed stream in the tubes of the heater in the case of a conventionally arranged flash zone can be reduced or eliminated when the flash zone of the present invention is employed. This would permit the use of smaller diameter tubes near the outlet to the heater or, with the same size tubes installed, the pressure drop required to force the feed through the heater would be less with the present invention than is feasible when the conventional flash zone is used.

A second embodiment of the present invention is illustrated in Figs. 4 and 5 and differs, in two respects, from the first embodiment in that the second embodiment provides a bowl-shaped receiving tray or pan 45 situated on the plate 26 immediately below flared end 15 of feed conduit 13. An inclined conduit 47 having a curved outlet portion 48 is connected to downcomer 21 to conduct reflux liquid from the rectifying section to pan 45. Conduit 47 is small in cross section and provides a head of liquid at 49 for preventing passage of the incoming feed through downcomer 21. A second liquid seal is provided at 50 to prevent passage of the stripping steam into flash zone 16 by way of downcomer 31.

The pan 45 is shaped in the manner illustrated in Fig. 4 and is so located with respect to the flared end 15 to cause most of the liquid entering the pan to be expelled upwardly and outwardly from it by the momentum of expanding feed vapors. In this manner, only a nominal amount of liquid "hold-up" is left in the pan 45 during the distillation operation. Drainage of liquid from the flash zone 16 is facilitated by inclination of the plate 26 towards downcomer 31. The operation is the same in both first and second embodiments of the present invention.

It will now be apparent that the present invention provides an improved flash zone arrangement in fractionating towers wherein the entering feed stock or charge is vaporized and expanded in the presence of the stripping steam and reflux liquid. Consequently, improved utilization of the stripping steam and maximum vaporization of the feed at a given maximum feed temperature are obtained, thereby increasing the overall thermal economy of the process. The present invention, in comparison with conventional flash zone arrangements, provides vaporization of a greater amount of the charge at the same maximum heater temperature and with the same overall steam consumption or, if the same vaporization is desired, then less steam consumption is required or maximum heater temperature will be lower by the subject arrangement. Since the stripping load is reduced, the number of trays in the stripping section may be decreased accordingly. Because the stripping steam is used to aid the vaporization of the liquid portion of the feed, steam that is required to be introduced into the tubes of the heater when conventionally arranged flash zones are used can be reduced or eliminated when the subject invention is used. This advantage makes possible a reduction in the size of some of the heater tubes or a lowering of the pressure drop required to pump the feed into the tower through the heater. Furthermore, reduction of steam consumption permits reduction in the size of the tower, condensing and vacuum equipment, or conversely, greater output with the same size of equipment as used with conventional arrangements of flash zone.

The flash zone arrangement of this invention has special application for use in atmospheric and vacuum distillation of hydrocarbon oil as for example, crude petroleum, petroleum residues, coal tars, shale oils, etc. However, it is equally applicable in any distillation process where all the heat for the process is introduced in the feed, that is, where no reboiling of the bottoms is provided.

Although two embodiments of the invention have been illustrated and described in detail, it is to be expressly understood that the invention is not limited thereto. Various changes can be made in the steps of the method and design and arrangement of the parts without departing from the spirit and scope of the invention as the same will now be understood by those skilled in the art.

What is claimed is:

1. In distillation apparatus of the class described, a fractionating tower having a rectifying section with liquid reflux therein, a stripping section disposed within said tower and in spaced relationship with said rectifying section, a separation section disposed in said tower, means including a discharge orifice for introducing heated feed stock into said separation section at a temperature sufficient to cause vaporization and separation of the liquid and vapor phases of the feed stock in the separation section, means for introducing a heated stripping medium into said stripping section, means for conducting the liquid reflux from the rectifying section into the stripping section to cause admixture of the stripping medium and the liquid reflux whereby part of the latter is vaporized, conduit means for receiving and conducting the mixture of stripping medium and vaporized liquid reflux from the stripping section into the feed stock discharge orifice to provide for the admixture of the stripping medium and vaporized liquid reflux and the feed stock while the vapor phase of the feed stock is in the first moments of expansion and in intimate contact with the liquid phase thereof.

2. In distillation apparatus of the class described, a fractionating tower having a rectifying section with liquid reflux therein, a stripping section disposed within said tower and in spaced relationship with said rectifying section, a separation section disposed within said tower, means including a discharge orifice for introducing feed stock heated to a temperature sufficient to cause vaporization and separation of the liquid and vapor phases of the feed stock in the separation section, means for introducing a heated stripping medium into said stripping section, means for conducting the liquid reflux from the rectifying section into the stripping section to cause admixture of the stripping medium and the liquid reflux whereby part of the latter is vaporized, conduit means cmmunicating at one end with the stripping section for conducting stripping medium and vaporized liquid reflux from the stripping section into the separation zone, said conduit means having at the other end an outlet disposed within said feed stock discharge orifice to provide for admixing of the stripping medium and vaporized liquid reflux with the feed stock during the first moments of expansion of the vapor of the latter and while the vapor is in intimate contact with the liquid phase of the feed stock.

3. In distillation apparatus of the class described, a fractionating tower having a rectifying section with liquid reflux therein, a stripping section disposed within said tower and in spaced relationship with said rectifying section to provide a separation section therebetween, means including a discharge orifice for introducing heated feed stock into the separation section at a temperature sufficient to cause expansion and vaporization thereof and separation of the liquid and vapor phases of the feed stock in the separation section, means for introducing a heated stripping medium into said stripping section, means for conducting the liquid reflux from the rectifying section into the stripping section to cause admixture of the stripping medium and the liquid reflux whereby part of the latter is vaporized, conduit means communicating at one end with the stripping section for conducting stripping medium and vaporized liquid reflux from the stripping section into the separation zone, said conduit means having at the other end an outlet disposed within said feed stock discharge orifice to provide for admixing of the stripping medium and vaporized liquid reflux with the feed stock during the first moments of expansion of the vapor of the latter and while the vapor is in intimate contact with the liquid phase of the feed stock, and a tray disposed within the separation section to receive and support thereon liquid reflux, said tray being positioned within the path of flow of feed stock and stripping medium and vaporized liquid reflux being introduced into the separation section to cause admixing of the liquid reflux and feed stock.

4. In distillation apparatus of the class described, a fractionating tower, a rectifying section disposed within said tower and comprising a plurality of spaced bubble trays, each bubble tray being adapted to receive liquid reflux from a tray above and for discharging liquid reflux to a tray below, a stripping section disposed within said tower and spaced below said rectifying section, a separation section disposed in the space between said rectifying and stripping section, a feed conduit projecting into said tower and having an outlet opening disposed centrally within the separation section, said feed conduit being connected to a source of feed stock heated to a temperature sufficient to cause expansion and vaporization thereof and separation of the liquid and vapor phases of the feed stock upon discharge through said outlet, a tray disposed within the separation section and spaced below said feed conduit outlet, means for conducting liquid reflux onto said tray from the lowermost bubble tray to said rectifying section, means for discharging liquid reflux from said tray into said stripping section, conduit means projecting into said tower to conduct and introduce a heated stripping medium into said stripping section to cause admixture of the stripping medium and the liquid reflux whereby part of the latter is vaporized, conduit means communicating at one end with the stripping section to receive and conduct stripping medium and vaporized liquid reflux from the stripping section into the separation zone, said conduit means having at the other end an outlet disposed within said feed stock outlet opening to provide for admixing of the stripping medium and vaporized liquid reflux with the feed stock during the first moments of expansion of the feed stock vapor and while the vapor is in intimate contact with the liquid phase of the feed stock.

5. In distillation apparatus of the class described, a fractionating tower, a rectifying section disposed within said tower and comprising a plurality of spaced bubble trays, each bubble tray being adapted to receive liquid reflux from a tray above and to discharge liquid reflux to a tray below, a stripping section disposed within said tower and spaced below said rectifying section, said stripping section comprising a plurality of second bubble trays spaced from each other, each of said second bubble trays being adapted to receive and discharge liquid reflux, a separation section disposed in the space between said rectifying and stripping sections, a feed conduit having a bell shaped outlet opening projecting into the separation section, said feed conduit being connected to a source of feed stock heated to a temperature sufficient to cause expansion and vaporization thereof and separation of the liquid and vapor phases of the feed stock upon discharge through said outlet opening, a tray disposed within the separation section and spaced below said feed conduit outlet, downcomer means for conducting liquid reflux onto said tray from the lowermost bubble tray of the rectifying section, means communicating with said tray to conduct liquid reflux from said tray onto the uppermost bubble tray of the stripping section, means for conducting heated stripping medium into the stripping section to cause the stripping medium to pass in contact with liquid reflux on each of the second bubble trays whereby part of the liquid reflux is vaporized, an aperture in said tray disposed in the separation section to pass the vaporized liquid reflux and stripping medium from the stripping section, a conduit secured at one end within said aperture and having the distal end thereof disposed within said bell shaped outlet opening whereby the mixture of vaporized liquid reflux and stripping medium is brought into admixture with the feed stock during the first moments of expansion of the vapor of the latter and while the vapors are in intimate contact with the liquid phase of the feed stock.

6. The distillation apparatus of claim 5 wherein a bowl shaped pan is supported on the tray disposed in the separation section and is adapted to receive therein reflux liquid from the downcomer means, said bowl shaped pan being positioned within the direct path of flow of the feed stock and stripping medium and vaporized liquid reflux to cause the admixing of the latter with a portion of liquid reflux carried on said bowl shaped pan.

References Cited in the file of this patent

UNITED STATES PATENTS

| | | |
|---|---|---|
| 1,850,930 | Heid | Mar. 22, 1932 |
| 1,938,118 | Snow | Dec. 5, 1933 |
| 2,062,266 | Jones | Nov. 24, 1936 |
| 2,073,258 | Wallis | Mar. 9, 1937 |
| 2,105,935 | Swanson | Jan. 18, 1938 |